(No Model.)

J. H. SALE.
COTTON CHOPPER AND CULTIVATOR.

No. 322,975. Patented July 28, 1885.

WITNESSES
Edwin L. Bradford
Morton Toulmin

INVENTOR
James Hunter Sale

Jo. H. Hunter
Attorney

UNITED STATES PATENT OFFICE.

JAMES HUNTER SALE, OF MURRAY, KENTUCKY.

COTTON CHOPPER AND CULTIVATOR.

SPECIFICATION forming part of Letters Patent No. 322,975, dated July 28, 1885.

Application filed May 5, 1885. (No model.)

*To all whom it may concern:*

Be it known that I, JAMES HUNTER SALE, a citizen of the United States, residing at Murray, in the county of Calloway and State of Kentucky, have invented certain new and useful Improvements in Cotton Choppers and Cultivators, of which the following is a specification, reference being had therein to the accompanying drawings.

This invention relates to improvements in cotton choppers and cultivators, and has for its object to provide a machine for this purpose which shall be efficient, simple, and cheaply manufactured. These objects are attained by the mechanism illustrated in the accompanying drawings, forming a part of this specification, in which—

Figure 1:
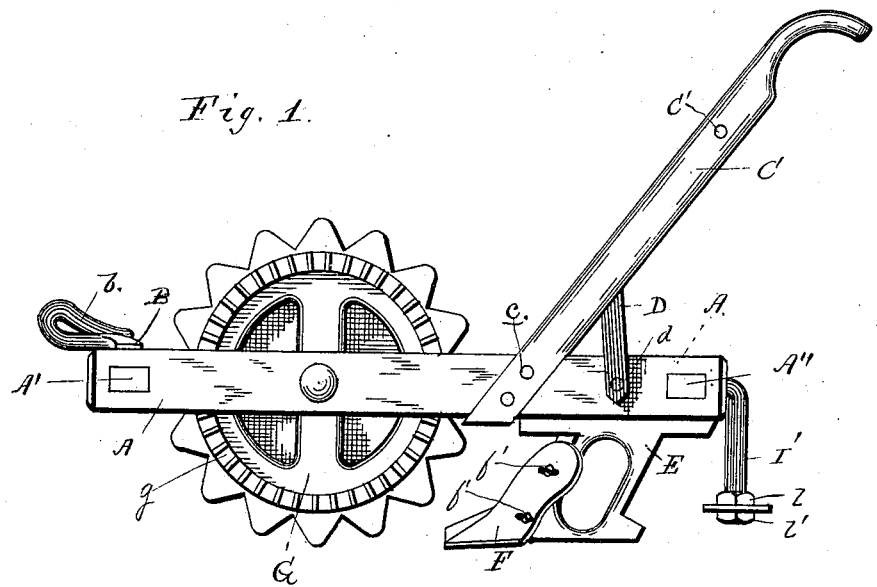
Figure 2:
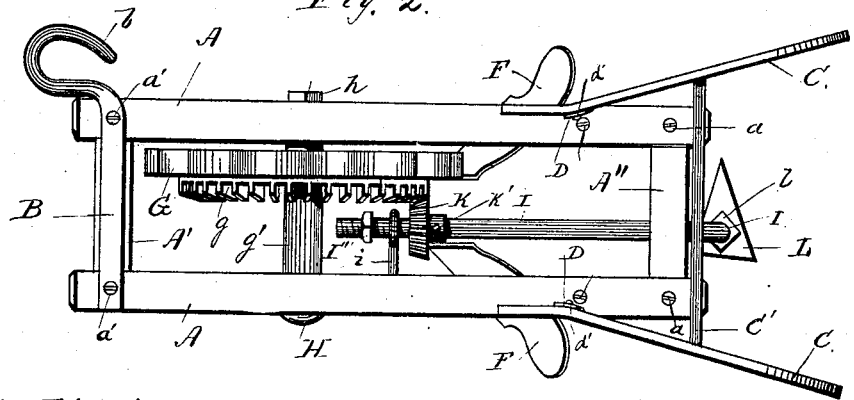
Figure 3:
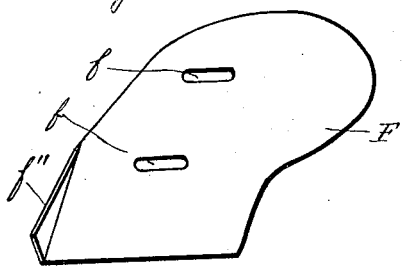
Figure 4:
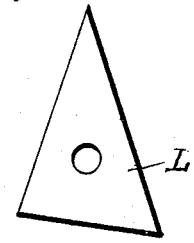

Figure 1 is a side elevation. Fig. 2 is a plan view. Fig. 3 is a detached enlarged view of one of the cultivator plows or scrapers. Fig. 4 is a detached enlarged view of the triangular cutter-blade.

The letter A indicates the frame of the machine, which consists of two parallel pieces of timber, A, connected to each other by means of cross-pieces A' A'' by mortise and tenon, and bolts $a\ a'$, and having at the forward end a transverse metal bar, B, secured to the top of the frame by the bolts $a'$. This bar adds to the strength of the frame, and, being provided with a hook, $b$, on one end, also serves the purpose of a draft-bar. A diagonal recess is cut on the outside of each of the frames A to receive the handles C, which are secured therein by means of the screws or bolts $c$. These handles are further secured to the frame and held at the proper angle thereto by means of the vertical metal braces D, having screws or bolts $d$, which enter the frame A, and bolts $d'$, which enter the handles C. The usual cross-piece, C', connects the two handles to each other.

To each of the pieces of timber A, (forming the frame,) on the under side, are attached two metal shoes, E, which serve the purpose to support the rear end of the machine, as well as the means whereby the cultivator plows or scrapers may be attached thereto. These plows or scrapers are indicated by the letter F, and have openings $f$ for the passage of the bolts $f'$, which enter the shoes E and secure the scrapers F thereto. If these openings $f$ are made in the form of slots, as indicated in Fig. 3, the scrapers on the opposite sides of the machine may be brought closer together or be placed a greater distance apart, thus furnishing a simple and easy method of adjustment.

In operating the machine these scrapers or plows are intended to pass one on each side of a row of plants. Each of these scrapers is provided with a wing, $f''$, the object of which is to prevent the scrapers from catching the plants, the flaring edge allowing the plant to spring aside in case it happens to be engaged.

G is a casting, and consists of a wheel having its periphery serrated and one side thereof provided with spur or bevel gearing $g$, and an elongated hub or axle, $g'$, having an opening therein for the passage of a bolt or shaft, H, having on one end a nut, $h$. The hub or axle $g'$ is intended to be of sufficient length to extend across the open space between the frame-pieces A, and thereby maintain the wheel in its proper place. Suitable openings are made in the frame-pieces A to receive the shaft H. The shaft H is passed through one of the openings in the frame A, then through the opening in the hub $g'$, then through the opening in the other side of the frame A. The nut $h$ is then placed on the end of the shaft H and screwed up, which completes the attachment of the wheel to the frame. A shaft, I, having its rear end, I', bent so as to approximate the form of an elbow, has a bearing in the cross-piece A'', and a suitable bearing, $i$, attached to one of the frame-pieces A, in which the shaft I is revolved by means of the adjustable pinion K, which is secured thereon by a suitable set-screw, K', and intergears with the gearing $g$ on the side of the serrated casting or wheel G. The end of the shaft I is threaded to receive a nut, I'', by means of which the position of shaft I may be adjusted in a longitudinal direction. The end I' of the elbow to the shaft I is also threaded and carries a triangular-shaped cutter, L, which is secured thereon by means of nuts $l\ l'$, one of which is above and the other below the cutter L. This method of attaching the cutter enables it to be placed higher or lower upon the elbow I', as well as to be placed at various angles while cutting plants, so as to give a "draw-cut" or otherwise, as may be found most effective in actual use.

As means are provided to adjust the shaft I in a longitudinal direction, or the pinion K upon said shaft, it will be seen that the cutter L may be brought near to or farther from the rear of the machine, according to circumstances.

Having described my invention, what I desire to secure by Letters Patent, and claim, is—

In a cotton-chopper, the combination, with the wheel and beveled gear, of the hoe-shaft provided with a pinion near one end, which engages with said gear, having its rear end terminating in an angle to the body and provided with two nuts, and a pointed hoe fitted between said nuts, whereby it is capable of being adjusted up and down and at any angle, so as to effect a draw-cut.

In testimony whereof I affix my signature in presence of two witnesses.

JAMES HUNTER SALE.

Witnesses:
J. R. COLEMAN,
GEO. W. CRAIG.